(12) United States Patent
Miyata et al.

(10) Patent No.: US 8,411,723 B2
(45) Date of Patent: Apr. 2, 2013

(54) SUPPORT STRUCTURE OF HEATER

(75) Inventors: Jotaro Miyata, Komaki (JP); Takashi Goshima, Kohnan (JP); Chikashi Ihara, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 947 days.

(21) Appl. No.: 12/168,544

(22) Filed: Jul. 7, 2008

(65) Prior Publication Data

US 2008/0272111 A1    Nov. 6, 2008

Related U.S. Application Data

(63) Continuation of application No. PCT/JP2007/050211, filed on Jan. 11, 2007.

(30) Foreign Application Priority Data

Jan. 13, 2006   (JP) .................................. 2006-005596

(51) Int. Cl.
    *F27D 1/00*   (2006.01)
(52) U.S. Cl. ........................... 373/71; 219/270; 219/536
(58) Field of Classification Search .................. 219/536; 373/109–137
    See application file for complete search history.

(56) References Cited

U.S. PATENT DOCUMENTS

| | | | | | |
|---|---|---|---|---|---|
| 1,832,354 | A | * | 11/1931 | Breyer ........................... | 432/120 |
| 4,011,395 | A | * | 3/1977 | Beck .............................. | 373/134 |
| 4,633,064 | A | * | 12/1986 | Atsumi et al. ................. | 219/270 |
| 4,741,692 | A | * | 5/1988 | Sadakata et al. .............. | 431/258 |
| 4,825,284 | A | * | 4/1989 | Soga et al. .................... | 257/717 |
| 5,211,999 | A | * | 5/1993 | Okada ........................... | 428/34.5 |
| 5,616,024 | A | | 4/1997 | Nobori et al. | |
| 5,882,807 | A | * | 3/1999 | Funato et al. ................. | 428/698 |
| 6,025,579 | A | * | 2/2000 | Tanaka et al. ................. | 219/544 |

(Continued)

FOREIGN PATENT DOCUMENTS

| EP | 0 493 089 A1 | 7/1992 |
|---|---|---|
| EP | 0 720 416 A2 | 7/1996 |

(Continued)

OTHER PUBLICATIONS

Extended Search Report issued in European Patent Application No. EP 07 70 6558 dated Mar. 4, 2011.

(Continued)

*Primary Examiner* — Jermele M Hollington
*Assistant Examiner* — Alesa Allgood
(74) *Attorney, Agent, or Firm* — Oliff & Berridge, PLC

(57) ABSTRACT

There is provided an electric heater support plate which is not likely to be softened or deformed during firing at a high temperature, even if a material to be fired contains an alkaline component or an Si component as a volatile component. A passage 2 for the material to be fired surrounded by a ceiling refractory 11, wall refractories 12 and a floor refractory 13 is provided with an electric heater 3 heating from above and an electric heater 5 heating from below. This electric heater 3 has at least its heating part 31 mounted and supported on a fire-resistant support plate 4, and this support plate 4 in this invention has a two-layer structure in which an insulating ceramic support plate 41 is laminated on an SiC-based ceramic plate 42. The two-layer structure support plates 4 are supported by refractories 14 installed in a furnace and are arranged in parallel in a plurality of rows in a longitudinal direction of the furnace, and the electric heater 3 mounted on the support plates is so constructed as to generate heat by an electric power supplied from an energizing terminal 32 exposed to the outside of a furnace wall.

8 Claims, 3 Drawing Sheets

U.S. PATENT DOCUMENTS

| | | |
|---|---|---|
| 2005/0053892 A1 | 3/2005 | Shiromizu et al. |
| 2005/0085057 A1* | 4/2005 | Hashikura et al. ............ 438/540 |
| 2005/0263516 A1 | 12/2005 | Natsuhara et al. |
| 2006/0199131 A1 | 9/2006 | Kawasaki et al. |
| 2007/0193998 A1* | 8/2007 | Ichino ........................... 219/216 |
| 2008/0272111 A1* | 11/2008 | Miyata et al. ................. 219/536 |

FOREIGN PATENT DOCUMENTS

| | | |
|---|---|---|
| GB | 1 256 320 | 12/1971 |
| GB | 2 264 849 A | 9/1993 |
| JP | 61012039 A * | 1/1986 |
| JP | A-62-108992 | 5/1987 |
| JP | 63129062 A * | 6/1988 |
| JP | A-06-236794 | 8/1994 |
| JP | A-08-014769 | 1/1996 |
| JP | A-2000-310491 | 11/2000 |
| JP | A-2003-112984 | 4/2003 |
| JP | A-2004-356624 | 12/2004 |
| JP | A-2005-265324 | 9/2005 |
| KR | 10-2004-0055044 | 6/2004 |

OTHER PUBLICATIONS

Human Translation of the specification of JP-A-61-012039, cited in the Oct. 14, 2011 Office Action.

Nov. 26, 2012 Office Action issued in European Patent Application No. 07 706 558.9.

* cited by examiner

_US 8,411,723 B2_

SUPPORT STRUCTURE OF HEATER

TECHNICAL FIELD

The present invention relates to the improvement of a support structure of an electric heater for heating which is used in an electric firing furnace. More particularly, it relates to a support structure of a heater of a continuous furnace in which an SiC-based material to be fired can be fired at a high temperature.

BACKGROUND ART

Heretofore, a continuous electric firing furnace is disclosed in Patent Document 1 in which an electric heater constituted of an electrically resistant heating element is arranged in the furnace to heat a material to be fired conveyed in the furnace. According to this document, it is disclosed that in a ceiling part of a furnace chamber, an electric heater such as a molybdenum disilicate-based cermet heating element is arranged in a direction crossing a conveyance direction of a treatment target at right angles. It is also disclosed that the heating element softens in excess of a temperature of 1300° C., and a heating part of the heater sags downwards, which might cause disconnection. Therefore, a support plate is arranged under the electric heater to prevent the sagging.

However, in recent years, a new material such as a functional ceramic or a highly heat-resistant and strong ceramic has been developed, and it becomes necessary to fire the material in an atmosphere controlled at a high temperature of 1500° C. At such a high temperature, even when an alumina-based refractory is used as the support plate to support the electric heater, the plate itself is unavoidably softened or deformed, which is a cause for shortening of life of the electric heater.

Furthermore, in a case where the material to be fired is an SiC-based ceramic containing an alkaline component or an Si component as a volatile component, problems occur that these components volatilized during the firing permeate and diffuse in the support plate of the alumina-based refractory and that the plate is more easily softened and deformed to further shorten the life of the support plate itself.

Patent Document 1: Japanese Patent Application Laid-Open No. 2000-310491: see claims, paragraphs from 0014, paragraphs of a mode for carrying out the present invention, FIG. 1 and FIG. 2

DISCLOSURE OF THE INVENTION

The present invention has been developed to solve the above problem, and an object thereof is to provide an electric heater support plate which is not easily softened or deformed during firing at a high temperature even in a case where a material to be fired contains an alkaline component or an Si component as a volatile component.

The above problem can be solved by a support structure of an electric heater in an electric firing furnace including the electric heater which heats the furnace at least from the upside toward the downside, characterized in that a heating part of the electric heater is mounted and supported on an upper surface of an insulating ceramic support plate laminated on an SiC-based ceramic plate.

Moreover, the present invention is embodied as the heater support structure, wherein the electric heater is an electric heater constituted of an electrically resistant heating element mainly made of a molybdenum disilicate cermet, and the ceramic support plate is made of an alumina ceramic or an alumina-mullite ceramic. Alternatively, the present invention is embodied as the heater support structure wherein the SiC-based ceramic plate is a ceramic plate mainly made of recrystallized SiC, sintered SiC, nitride bonded SiC or Si impregnated SiC.

Furthermore, the present invention can be embodied in a mode in which the electric firing furnace fires an SiC-based material to be fired in a high temperature region at a maximum temperature of 1300° C. or more. In addition, the present invention is preferably embodied in a mode in which the electric firing furnace is a continuous furnace, a ceramic plate mainly made of Si impregnated SiC is used as the SiC-based ceramic plate in a temperature region of 1200° C. or less, and a ceramic plate mainly made of recrystallized SiC, sintered SiC or nitride bonded SiC is used in a region above 1200° C. In general, a temperature of a portion where the electric heater is installed is a temperature which is about 50 to 100° C. higher than a temperature of a portion through which a material to be heated passes, so that the above temperature region is selected in view of this situation.

In the heater support structure of the present invention, the heating part of the electric heater is mounted and supported on the upper surface of the insulating ceramic support plate laminated on the SiC-based ceramic plate, so that the SiC-based ceramic plate which comes in contact with the atmosphere in the furnace is not eroded with a erosive gas generated from the material to be fired at the high temperature, for example, the alkaline component, the Si component or the like. In addition, the SiC-based ceramic plate is highly strong at the high temperature. In consequence, the whole support plate is not easily softened or deformed.

Moreover, when in a continuous electric firing furnace to fire an SiC-based material to be fired at a high temperature of 1300° C. or more, recrystallized SiC or sintered SiC having an oxidizing region at 950 to 1100° C., or nitride bonded SiC is arranged at a high temperature in excess of 1200° C. and Si impregnated SiC having a low maximum use temperature is arranged at a low temperature of 1200° C. or less, a continuous electric firing furnace generally having high durability can advantageously be provided.

BRIEF DESCRIPTION OF THE DRAWINGS

FIG. 2 shows illustrations (A) and (B) of a vertical section showing an embodiment and the like.

DESCRIPTION OF REFERENCE NUMERALS

11: ceiling refractory, 12: side wall refractory, 13: floor refractory, 14: refractory
2: passage of material to be fired
3, 5: electric heater, 31: heating part, 32: energizing terminal
4: fire-resistant support plate, 41: ceramic support plate, 42: SiC-based ceramic plate

BEST MODE FOR CARRYING OUT THE INVENTION

Next, an embodiment of a heater support structure according to the present invention will be described with reference to FIGS. 1 to 3.

Figure 3:
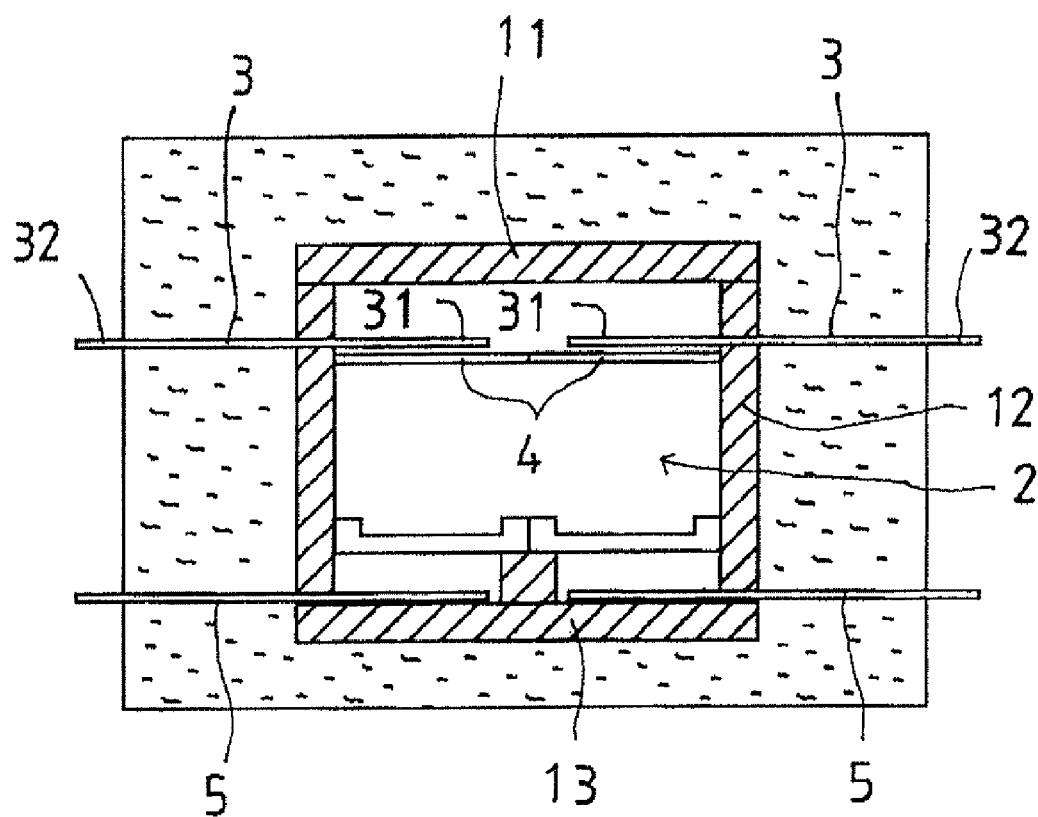
FIG. 3 is a sectional view of a vertical main part showing a continuous firing furnace to which the present invention is applied.

FIG. 3 shows a sectional view of a main part in a direction crossing, at right angles, a longitudinal direction of a continuous firing furnace to which a heater support structure of the present invention is applied. In the drawing, electric heaters 3 to heat downwards is disposed in an upper part of a passage 2 of a material to be fired which is surrounded by a ceiling refractory 11, a side wall refractory 12 and a floor refractory 13, and electric heaters 5 to heat upwards is disposed in a lower part of the passage.

Figure 1:
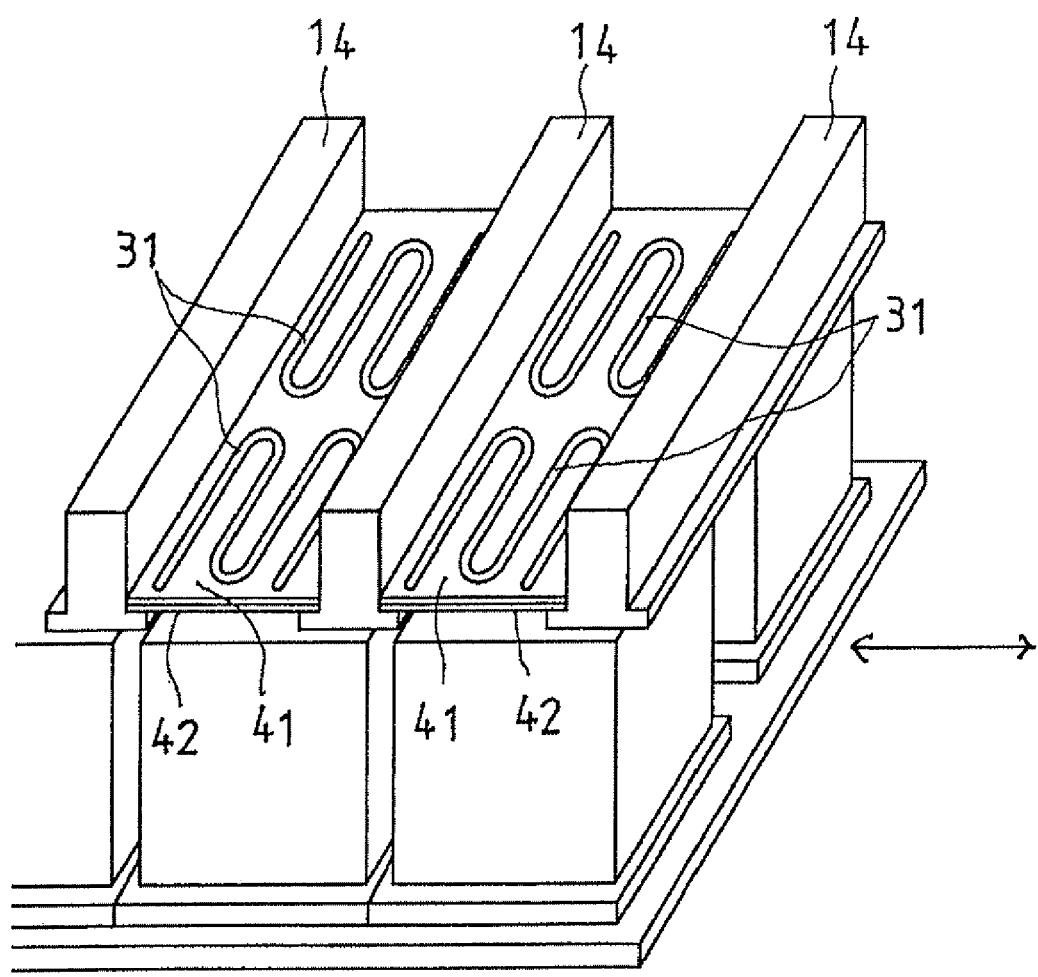
FIG. 1 is a perspective view of a main part of a structure in a furnace, showing a support structure of a heater according to the present invention.
Figure 2A:
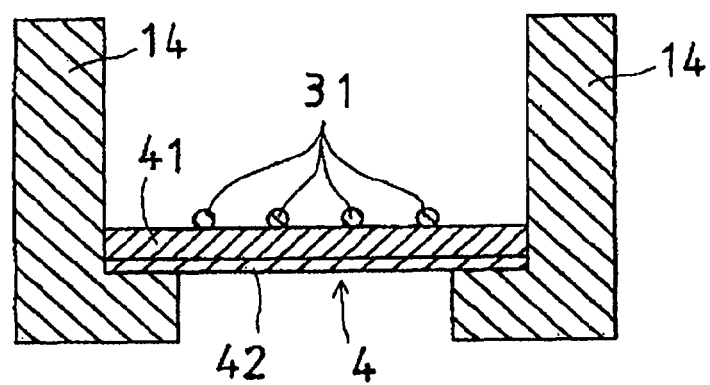
Figure 2B:
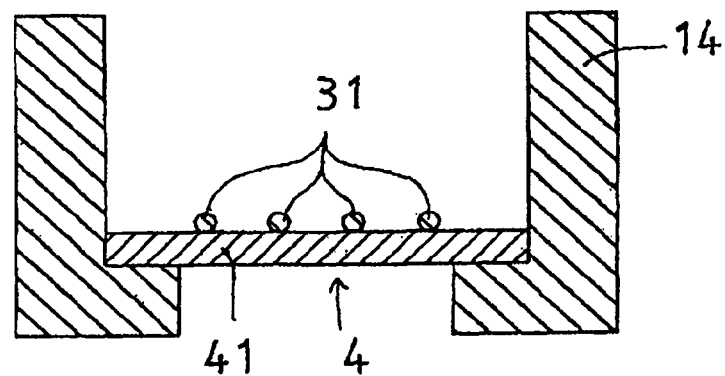

At least heating parts 31 of the electric heaters 3 arranged in this upper part are mounted and supported on fire-resistant support plates 4, but the present invention is characterized in that as shown in FIGS. 1 and 2A, this support plate 4 has a two-layer structure in which an insulating ceramic support plate 41 is laminated on an SiC-based ceramic plate 42. It is to be noted that the support plate 4 having the two-layer structure according to the present invention is supported by refractories 14 installed in the furnace, and a plurality of rows of support plates are arranged in the longitudinal direction of the furnace. It is further constituted that an electric power is supplied to the mounted electric heaters 3 from energizing terminals 32 exposed externally from furnace walls to generate heat. It is to be noted that FIG. 2B illustrates a conventional structure.

The electric heater of the present invention is preferably constituted of an electrically resistant heating element mainly made of a molybdenum disilicate cermet. As the ceramic support plate 41 on which the electric heater 3 is mounted, an alumina ceramic or an alumina-mullite ceramic is preferable, because the material has an excellent electric insulating property and is easily available. A thickness of the material can be reduced to 10 mm or less which is about ½ of a thickness of a conventional constitution.

Moreover, as the SiC-based ceramic plate 42 laminated on the underside of the ceramic support plate 41, a ceramic plate having a thickness of 5 to 10 mm and mainly made of recrystallized SiC, sintered SiC, nitride bonded SiC or Si impregnated SiC is applied. As such a ceramic plate, a highly pure ceramic made of 95% or more, preferably 98% or more of recrystallized SiC, sintered SiC, nitride bonded SiC or Si impregnated SiC is preferable.

Furthermore, the SiC-based ceramic plate 42 preferably blocks the whole lower surface of the ceramic support plate 41 from the atmosphere, and may be provided with 10 mm or less slits or holes having a diameter of 10 mm or less.

In addition, an electric firing furnace to which such a heater support structure is applied will be described. The present invention is preferably used in an electric firing furnace which fires an SiC-based material to be fired in a high temperature region at a maximum temperature of 1300° C. or more. On such temperature conditions, when the material to be fired is an SiC-based composition, a slight amount of a contained alkaline component such as K, Na is volatilized, and an Si component is further unavoidably volatilized. However, the ceramic support plate 41 of the present invention is blocked by the lower SiC-based ceramic plate 42, and the SiC-based ceramic plate 42 itself has a high corrosion resistance against the above volatile components. Therefore, in such severe atmosphere, in the present invention, long durability of 12 months or more, which is twice or more that of a conventional example, is obtained.

Moreover, in the continuous electric firing furnace which fires the above SiC-based material to be fired in the high temperature region at a maximum temperature of 1300° C. or more, the ceramic plate mainly made of Si impregnated SiC is used as the SiC-based ceramic plate 42 in the temperature region of 1200° C. or less, and the ceramic plate mainly made of recrystallized SiC, sintered SiC or nitride bonded SiC is used in region above 1200° C. The ceramic plate may selectively be used in this manner. Recrystallized SiC, sintered SiC, or nitride bonded SiC has an oxidizing region in a low temperature region of 950 to 1100° C., and is hence used on a high temperature side in excess of 1200° C., and Si impregnated SiC having a comparatively low maximum use temperature is used on a low temperature side of 1200° C. or less. In this case, a highly durable continuous electric firing furnace using features of the materials and having a generally excellent maintenance property is obtained.

INDUSTRIAL APPLICABILITY

As described above, the present invention has a remarkably large industrial value as a heater support structure which solves conventional problems.

The invention claimed is:

1. A support structure of an electric heater in an electric firing furnace including the electric heater which heats the furnace at least from the upside toward the downside, wherein a heating part of the electric heater is mounted and supported by the heater support structure, the heater support structure comprising:
   an upper surface of an insulating ceramic support plate, the heating part being mounted and supported by the upper surface of the insulating ceramic support plate; and
   an upper surface of a SiC-based ceramic plate, the insulating ceramic support plate stacked on the upper surface of the SiC-based ceramic plate and being thicker than the SiC-based ceramic plate such that the insulating ceramic support plate prevents deformation of the SiC-based ceramic plate.

2. The heater support structure according to claim 1, wherein the upper surface of a SiC-based ceramic plate includes a plurality of holes with a diameter of 10 mm or less.

3. The heater support structure according to claim 1, wherein the SiC-based ceramic plate has a thickness of 5 mm to 10 mm.

4. The heater support structure according to claim 1, wherein the electric heater is an electric heater constituted of an electrically resistant heating element mainly made of a molybdenum disilicate cermet, and the insulating ceramic support plate is made of an alumina ceramic or an alumina-mullite ceramic.

5. The heater support structure according to claim 4, wherein the SiC-based ceramic plate is a ceramic plate mainly made of recrystallized SiC, sintered SiC, nitride bonded SiC or Si impregnated SiC.

6. The heater support structure according to claim 1, wherein the SiC-based ceramic plate is a ceramic plate mainly made of recrystallized SiC, sintered SiC, nitride bonded SiC or Si impregnated SiC.

7. The heater support structure according to claim 6, wherein the electric firing furnace fires an SiC-based material to be fired in a high temperature region at a maximum temperature of 1300° C. or more.

8. The heater support structure according to claim 7, wherein the electric firing furnace is a continuous furnace, the SiC-based ceramic plate comprises: a ceramic plate mainly made of Si impregnated SiC when the electric firing furnace is operated in a temperature region of 1200° C. or less, and a ceramic plate mainly made of recrystallized SiC, nitride bonded SiC or sintered SiC when the electric firing furnace is operated in a temperature region of above 1200° C.

* * * * *